Oct. 17, 1939.    V. SENCE    2,176,373
WINDSHIELD WIPER
Filed July 25, 1934    2 Sheets-Sheet 1
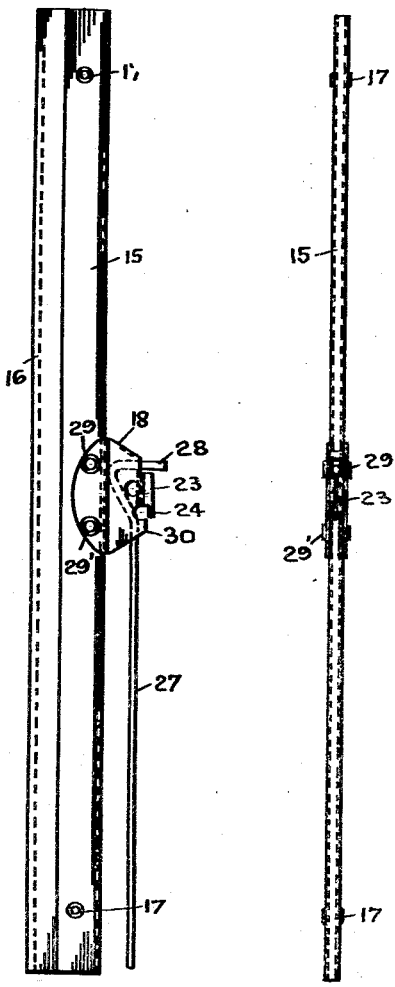
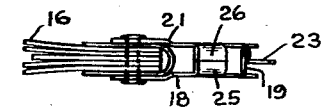
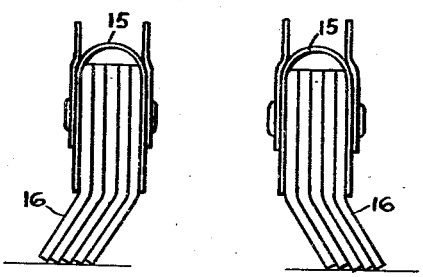
INVENTOR
Victor Sence
BY
ATTORNEY Oct. 17, 1939.  V. SENCE  2,176,373
WINDSHIELD WIPER
Filed July 25, 1934   2 Sheets-Sheet 2
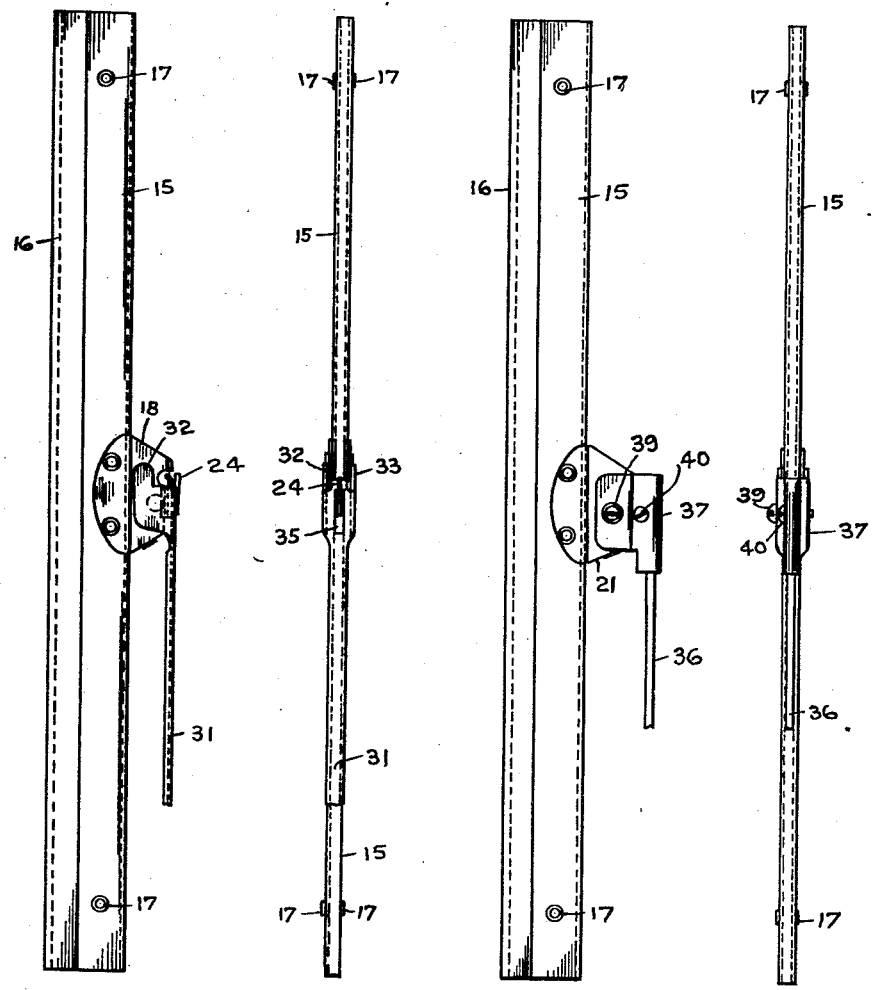
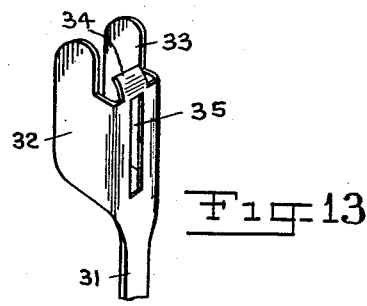
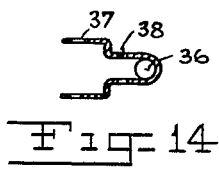
INVENTOR
Victor Sence
BY
ATTORNEY Patented Oct. 17, 1939

2,176,373

UNITED STATES PATENT OFFICE 2,176,373

WINDSHIELD WIPER

Victor Sence, New York, N. Y., Aloysius McMahon and Lillian Robert, executors of said Victor Sence, deceased, assignors to John C. Gonsalves, New York, N. Y.

Application July 25, 1934, Serial No. 736,881

1 Claim. (Cl. 15—250)

My invention relates to improvements in windshield wipers and more particularly has reference to the mounting or hinging of a wiper upon the oscillating arm, and in the construction and arrangement of the wiper itself.

Referring to the accompanying drawings, I have illustrated in Fig. 1, in side elevation, a suitable form of wiper embodying an application of my invention. Fig. 2 is a view looking from right to left at Fig. 1. Fig. 3 is an enlarged detail of one-half or side of the wiper mounting or bearing, and Fig. 4 is a similar view in perspective showing the other half or side. Fig. 5 is a view looking end-on of one form of the wiper. Fig. 6 is a perspective view, partly broken away, illustrating the wiper shell or body portion. Fig. 7 is an end view of a modified form of wiper showing the position of the same when moving rightwardly, and Fig. 8 a similar view showing its position when moving leftwardly. Fig. 9 is a view similar to Fig. 1 showing the application of a different form of arm. Fig. 10 is a view looking from right to left at Fig. 9. Fig. 11 is also a view similar to that shown in Fig. 1, showing another form of arm attached, and Fig. 12 is a view looking from right to left at Fig. 11. Fig. 13 is an enlarged detail of the end of the arm shown in Figs. 9 and 10, and Fig. 14 is a cross-sectional view of the end of the arm shown in Figs. 11 and 12.

Referring now more particularly to Figs. 6 to 8 inclusive, it will be observed that the body portion of the wiper consists of a looped or bent-over piece of sheet metal 15, forming a channel into which strips of rubber 16 may be secured in parallel arrangement as shown to advantage in Figs. 7 and 8. These rubber strips are preferably of about the same size and may be secured within the channel by any suitable means such as the eyelets 17. Being of equal size, the edges of the rubbers are in the same plane and the edges rest substantially flat upon the glass of the windshield so that when moved rightwardly, looking at Fig. 7, the lower edges at one side of each of the rubber strips rub upon the glass and when moved oppositely, as shown in Fig. 8, the opposite lower edges of the rubber strips rub upon the glass, thus insuring five lines of rubbing contact when five rubbers are used, and irrespective of the direction in which the wiper moves. Whereas, in other arrangements of the rubbers, such as shown in Fig. 5, only one or perhaps two of the rubber edges wipe the glass when moved in either direction.

The holder or bearing for the arm consists of two parts, shown in Figs. 3 and 4. The one part 18 being provided with an offset 19 which passes beneath the offset 20 of the other half 21, when they are assembled as shown in Figs. 1 and 2. The upwardly projecting flange 23 terminates at the bottom in a tongue or hook 24, and at the top the flanges 25, 26 are adapted to abut, serving with the flange 19 as spacing elements for separating the two halves to permit of the insertion of the end of an arm such as 27 which, in the instance shown, is provided with a hook-like end 28. The two halves are riveted through the channel holder 15 as indicated at 29, 29' and in mounting the hook 28, the end of it is passed downwardly between the projecting portions 30 and opposite sides 18, 21, coming up through the opening above the flanges 19, 20, as shown in Figs. 1 and 2, thus providing a suitable hinge or pivotal bearing for the wiper upon the hook, allowing the wiper to oscillate upon an axis at right angles to the hook.

By reference now more particularly to Figs. 9 and 10, it will be observed that by turning the wiper upside down as there shown, an arm 31 having side flanges 32, 33 and provided with a tongue 34 and cut-away portion 35, may be inserted and similarly hingedly mounted by passing the tongue 34 beneath the projecting toe 24, allowing said toe to pass through the opening 35, the tongue 34 being guided between the halves 18, 21 and kept in place by the side flanges 32, 33.

In the modification shown in Figs. 11 and 12, it will be observed that upon the end of the arm 36 may be provided an end piece 37 shown in cross-section in Fig. 14, where it will be observed that the wire 36 is pinched in the loop of the end piece 37, the projecting sides thereof being perforated at 37, 38 to receive screws such as 39, 40, the former passing through the holes 18' and 21' in the members 18, 21 for pivotally securing the same.

Of course it will be understood that various modifications may be made in the construction and arrangement of parts, without departing from the spirit of the invention as claimed.

I claim:

A windshield wiper comprising a wiper arm having a U-shaped attaching portion and a lip at its end, a wiping element, a clip secured to the wiping element by which it is attached to the wiper arm, said clip having two spaced sides adapted to fit between the side flanges of the U-shaped attaching portion of the wiper arm and having in its back a notch to receive the lip at the end of the wiper arm, said clip also having a finger extending outwardly, then laterally over the notch to overlie and engage the portion of the wiper arm having said lip and retain the lip in the notch.

VICTOR SENCE.